March 17, 1942.   J. F. TRITLE ET AL   2,276,807
VEHICLE DRIVE SYSTEM
Filed Aug. 4, 1939
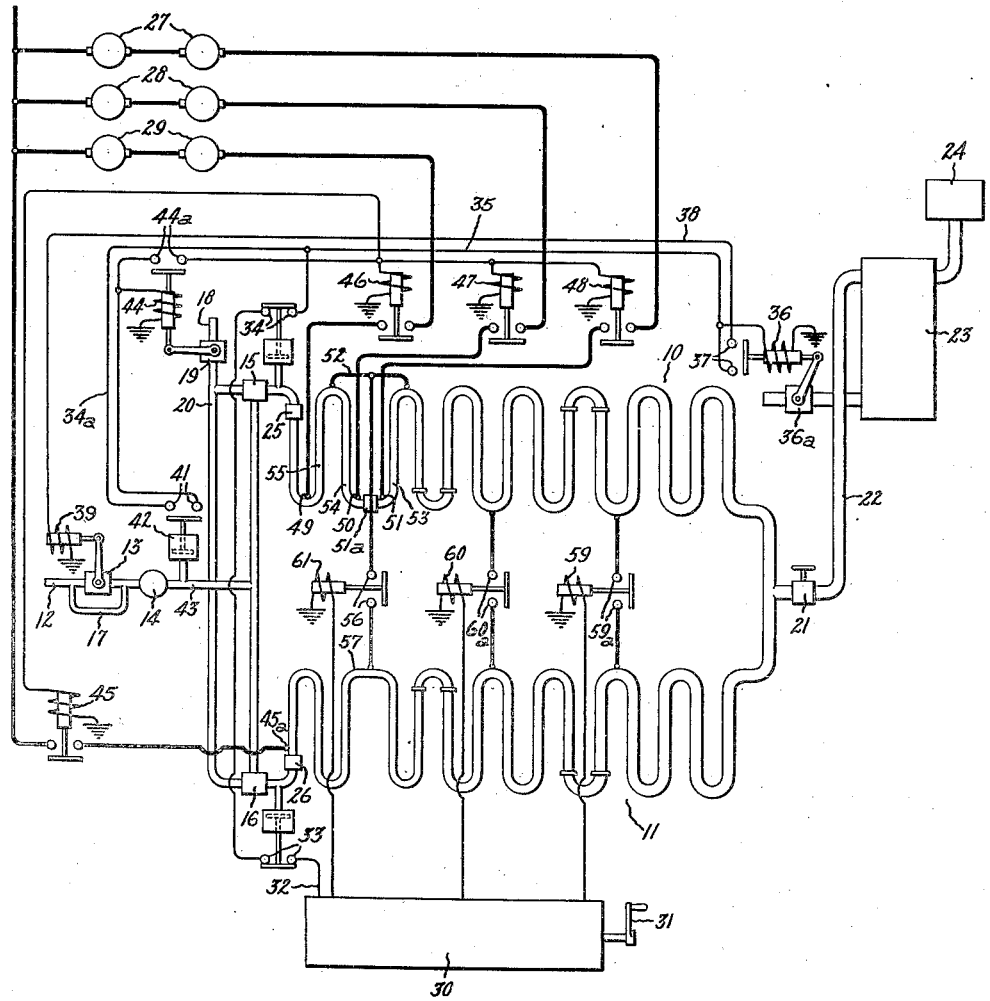
Inventors:
John F. Tritle,
Jacob W. McNairy,
Charles A. Petersen,
by Harry E. Dunham
Their Attorney.

Patented Mar. 17, 1942

2,276,807

UNITED STATES PATENT OFFICE 2,276,807

VEHICLE DRIVE SYSTEM

John F. Tritle, Jacob W. McNairy, and Charles A. Petersen, Erie, Pa., assignors to General Electric Company, a corporation of New York Application August 4, 1939, Serial No. 288,372

15 Claims. (Cl. 172—179)

This invention relates to vehicle drive systems, more particularly to dynamic braking systems for the driving motors of locomotives or other vehicles, and has for its objects a dynamic braking control system utilizing a braking resistor in the form of a duct through which a cooling fluid is passed and provided with means for controlling the electric connections of the resistor in response to the condition of the cooling fluid.

We have shown our invention in one form as applied to a resistor of the type described and claimed in a copending application Serial No. 347,048, filed by John F. Tritle and Charles A. Petersen on July 23, 1940, and assigned to the same assignee as this application. This resistor is in the form of a duct through which a cooling fluid is circulated to dissipate energy. In accordance with our invention, we provide means responsive to a condition of the cooling fluid supplied to the resistor for controlling the electric connections of the resistor. More specifically we provide control means for admitting cooling fluid to the resistor substantially simultaneously with the connection of the resistor in the braking circuit, together with means responsive to failure of the cooling fluid supply and responsive to excessive fluid pressure in the resistor for disconnecting the resistor from the dynamic braking circuit.

For a more complete understanding of our invention reference should be had to the accompanying drawing, the single figure of which is a diagrammatic representation of a dynamic braking system embodying our invention.

Referring to the drawing, for purposes of clarity we have shown only the electrical connections utilized during dynamic braking of the motors, including the electrical connections for connecting the resistor in the motor dynamic braking circuit controlled by the resistor, the control means for the motors utilized in motoring operation not being shown. It is contemplated that this dynamic braking system is especially useful in the electric vehicle drive system described and claimed in a copending application of Lewis W. Webb and Jacob W. McNairy, Serial No. 250,532, filed January 12, 1939, assigned to the same assignee as this application.

In the form shown, the resistor comprises a plurality of lengths of tubing made of electrical resistor material such as stainless steel, the lengths being mechanically connected together at their ends to form two duct sections 10 and 11 which are however mechanically and electrically connected together. The various lengths of the resistor may be suitably arranged if desired in layers to provide the most compact assembly and one most conveniently fitting into the space available for it on the vehicle.

A suitable cooling fluid preferably water at a suitable low pressure, such as 75 pounds per square inch, is fed through a pipe 12, a normally closed valve 13, and a check valve 14 to the two steam operated water injectors 15 and 16. A by-pass pipe 17 around the valve 13 provides for the continuous flow of a small amount of water through the resistor, even when it is not being used, for the purpose of maintaining the resistor at a suitable high temperature during cool weather to prevent freezing.

High pressure steam is supplied from a pipe 18 through a steam valve 19, biased closed as by a spring, and pipe 20 to the water injectors 15 and 16. This assures a positive or pressure feed of the cooling water. It will be understood that for purposes of space economy the resistor is made as small as possible and may be heated in a very short interval, such as a few seconds, after the beginning of dynamic braking to a very high temperature such that steam is formed rapidly in the resistor with consequent considerable back pressure by the steam against the entrance of cooling water.

From the resistor sections 10 and 11 through which it will be noted the cooling water flows in separate parallel streams, the two sections 10 and 11 being connected in parallel with each other for the circulation of cooling water, the heated water and steam passes through a manually-operated shut-off valve 21 and the pipe 22 to the separator 23 in which the water is separated from the steam. The steam then goes on to a condenser 24.

The resistor sections 10 and 11 are electrically insulated from the cooling water supply pipes by means of sections of pipe 25 and 26 made of a suitable electrically insulating material such as a molded compound. At their opposite ends no insulating pipe sections are provided between the sections and the pipe 22 which therefore constitutes a ground connection.

Furthermore the tubes forming the resistor gradually increase in cross-sectional area in steps by increasing the diameters from the left-hand end toward the right-hand end of each section, i. e., in the direction of the flow of water through the resistor sections. The purpose of thus increasing the tube diameters is to reduce the water pressure required of the steam injectors to force the water and steam through the tubes. As the water passes through the tubes, an increasing amount of it is converted into steam and, as a result, the pressure drop per unit length of the tube would increase greatly if the tube diameters were not increased to accommodate the greater volume of steam. The resistor is maintained at a substantially uniform temperature which is substantially the boiling temperature of the water.

As shown, the motors to be dynamically braked are connected to the resistor in three series-connected pairs 27, 28 and 29 which are connected in parallel with each other. A suitable controller 30 is provided for controlling the connections of the motors to the resistor, this controller being preferably a rotatable drum or cam switch controller having an operating handle 31. To establish dynamic braking connections, the controller is turned to a first position from its off-position in which one side of a suitable source of control voltage supply, the other side of which is grounded, is connected to a control conductor 32. The circuit leads through the conductor 32, the normally closed switches 33 and 34, the conductor 35, and the coil 36 to ground. This coil 36 opens a water drain valve 36a on the separator and closes an interlock switch 37 which closes a circuit through the conductor 38 and the coil 39 to ground. Energization of the coil 39 opens the cooling water valve 13.

Admission of cooling water by the opening of the valve 13 closes a cooling water pressure responsive switch 41, this switch being biased to the open position, as by a spring not shown, and operated to its closed position by a piston in a cylinder 42 connected to the cooling water supply pipe 43. The switch 41 closes a circuit from the conductor 35 through the switch 41 and the coil 44 to ground. This coil 44 opens the steam valve 19 admitting steam to the injectors 15 and 16 and closes an interlock switch 44a which closes a circuit from the conductor 35 through the switch 41 for the coils 45, 46, 47 and 48 to ground. The coil 45 closes one side of the dynamic braking circuit, thereby connecting one side of the parallel motor circuit to a point 45a on the braking resistor. The coils 46, 47 and 48 operate switches on contactors in the respective circuits of the pairs of motors whereby the other sides of the motors are connected to selected points 49, 50 and 51 of the resistor.

The points 50 and 51 are electrically insulated from each other by a section of electrically insulating tubing 51a. This arrangement together with the conductor 52 provides for the connection of short sections of the resistor permanently in circuit with the pairs of motors. Thus the pairs 27, 28 and 29 have the resistor sections 53, 54 and 55 permanently connected respectively in series with them for stabilization purposes, these sections not being short-circuited later on by the closure of the last short circuiting contactor 56. Also the section 57 on the left-hand end of the section 11 is not short-circuited and it is always included in circuit with the motors.

It will be noted that the sections 10 and 11 are connected in series with each other electrically in the dynamic braking circuit.

In the event of failure of the cooling water supply, the switch 41 opens in accordance with its bias, and thereby opens the circuits of the coils 44, 45, 46, 47 and 48 thereby to interrupt the supply of steam to the injectors and also open the dynamic braking circuit.

The switches 33 and 34 are operated by pistons in cylinders connected to the resistors adjacent the injectors 16 and 15 respectively. In the event that the back steam pressure in the resistor becomes excessive, these switches 33 and 34 are opened whereby the motors are disconnected from the braking resistor and the supply of steam and cooling water is shut off. This interruption of the braking by the opening of the switches 33 and 34 and also by the opening of the switch 41 may be only temporary. Dynamic braking will be resumed by the closing of these switches in accordance with their spring or other biases when the steam pressure drops to a suitable low value or when the cooling water supply is resumed, as the case may be.

Continued movement of the controller 30 operates to energize the operating coils 59, 60 and 61 in the order named which close their switches 59a, 60a and 56 to short-circuit sections of the braking resistor.

While we have shown a particular embodiment of our invention, it will be understood, of course, that we do not wish to be limited thereto, since many modifications may be made and we, therefore contemplate by the appended claims to cover any such modifications as fall within the true spirit and scope of our invention.

What we claim as new and desire to secure by Letters Patent of the United States is:

1. In combination, a driving motor, a braking resistor in the form of a duct, means for electrically connecting said resistor to said motor for dynamic braking of said motor, means for passing a cooling fluid through said resistor, and means controlled by a cooling fluid in said resistor for controlling said electrical connections.

2. In combination, a driving motor, a braking resistor in the form of a duct, means for electrically connecting said resistor to said motor for dynamic braking of said motor, fluid means for passing a cooling fluid through said resistor, said resistor increasing in cross-sectional area in the direction of flow of the cooling fluid therethrough, and means controlled by said fluid means for controlling said electrical connecting means.

3. In a vehicle drive system, a driving motor, a braking resistor in the form of a duct, means for electrically connecting said resistor to said motor for dynamic braking of said motor, means for passing a cooling fluid through said resistor, said resistor increasing in cross-sectional area in the direction of flow of the cooling fluid therethrough, and means responsive to the pressure of said cooling fluid for controlling the electrical connection of said resistor to said motor.

4. In a vehicle drive system, a driving motor, a braking resistor in the form of a duct, switching means for electrically connecting said resistor to said motor for dynamic braking of said motor, means for passing cooling fluid through said resistor, control means movable to admit cooling fluid to said resistor, and means responsive to the pressure of the cooling fluid for operating said switching means.

5. In a vehicle drive system, a driving motor, a braking resistor for said motor in the form of a duct connected in sections to form at least two parallel paths for the circulation of a cooling fluid therethrough, a fluid pressure supply means connected to each of said sections for supplying cooling fluid under pressure to each of said sections independently of the other section, conduit means for supplying fluid to said pressure supply means, and means for connecting at least portions of said parallel paths electrically in series with each other to said motor for dynamic braking, and means responsive to the pressure of the cooling fluid for controlling the connection of said braking resistor to said motor.

6. In a vehicle drive system, a driving motor, a braking resistor for said motor in the form of a duct connected in sections to form at least two parallel paths for the circulation of a cooling fluid therethrough, means for supplying a cooling fluid under pressure to each of said sections independent of the other, means for connecting at least portions of said parallel paths electrically in series with each other to said motor for dynamic braking, and means responsive to fluid pressure in said resistor for controlling the electrical connection between said resistor and said motor.

7. In a vehicle drive system, a driving motor, a braking resistor in the form of a duct connected into at least two parallel paths for the circulation of cooling fluid therethrough, means for connecting at least portions of said parallel paths electrically in series with each other to said motor for dynamic braking, a source of supply of cooling fluid for said resistor, electrically insulating pipes connecting said source to each of said braking resistor paths, a braking controller for said motor, means responsive to an initial movement of said controller for admitting cooling fluid to said resistor, and means responsive to the pressure of the cooling fluid for operating said connecting means to disconnect said resistor from said motor.

8. In a vehicle drive system, a driving motor, a braking resistor in the form of a duct, means for passing cooling water through said resistor, connecting means for electrically connecting said braking resistor to said motor, a controller for operating said connecting means, means responsive to movement of said controller for admitting cooling water to said resistor, and means responsive to the pressure of cooling water in said resistor for operating said connecting means to disconnect said resistor from said motor.

9. In a vehicle drive system, a plurality of driving motors, a braking resistor in the form of a duct, means for passing cooling fluid through said resistor, a controller for electrically connecting said resistor to said motors, means responsive to an initial movement of said controller for admitting cooling fluid to said resistor, and means responsive to the pressure of said cooling fluid for controlling the electrical connections between said braking resistor and said motors.

10. In a vehicle drive system, a plurality of driving motors, a braking resistor in the form of a duct, means for passing cooling fluid through said resistor, a controller for electrically connecting said resistor to said motors, means responsive to an initial movement of said controller for admitting cooling fluid to said resistor, means responsive to fluid pressure in said resistor for controlling the electrical connections between said resistor and said motors.

11. In a vehicle drive system, a plurality of driving motors, a tubular braking resistor connected into at least two parallel paths for the circulation of cooling water therethrough, at least portions of said parallel paths being connected electrically in series with each other, a source of supply of cooling water for said resistor, electrically insulating pipes connecting said source to each of said parallel paths, a controller for controlling the connections of said braking resistor to said motors, means responsive to an initial movement of said controller for admitting cooling water to said resistor and means responsive to the pressure of said cooling water for controlling the electrical connections between said braking resistor and said motors.

12. In a vehicle drive system, a prime mover, an electric generator driven by said prime mover, a plurality of driving motors for said vehicle, a tubular braking resistor connected into at least two parallel paths for the circulation of cooling water therethrough, at least portions of said parallel paths being connected electrically in series with each other, a source of supply of cooling water for said resistor, electrically insulating pipes connecting said source to each of said parallel paths, a controller for connecting said braking resistor to said motors, means responsive to an initial movement of said controller for admitting cooling water to said resistor, means responsive to the pressure of said cooling water for controlling the electrical connections between said braking resistor and said motors, and means responsive to fluid pressure in said braking resistor for controlling the electrical connections between said braking resistor and said motors.

13. In combination, a driving motor, a braking resistor for said motor in the form of a duct, means for electrically connecting said resistor to said motor for dynamic braking of said motor, pressure supply means for supplying fluid to said resistor under a predetermined pressure, conduit means for supplying a cooling fluid under pressure to said pressure supply means, means responsive to the pressure of the fluid in said conduit means for causing operation of said fluid pressure in said resistor for controlling said connecting means to disconnect said resistor from said motor when the fluid pressure in said resistor reaches a predetermined maximum value.

14. In combination, a driving motor, a braking resistor for said motor in the form of a conduit connected in sections to form at least two parallel paths for the circulation of a cooling fluid therethrough, means for electrically connecting said resistor to said motor for dynamic braking of said motor, a separate pressure supply means connected to each of said parallel sections for supplying cooling fluid to each of said sections independently of the pressure supply means for the other section, and means responsive to the fluid pressure in each of said resistor sections for controlling said connecting means to disconnect said resistor from said motor when the fluid pressure in one of said sections reaches a predetermined maximum value.

15. In combination, a driving motor, a braking resistor for said motor in the form of a conduit connected in sections to form at least two parallel paths for the circulation of a cooling fluid therethrough, means for electrically connecting said resistor to said motor for dynamic braking of said motor, pressure supply means connected to each of said parallel sections for supplying fluid to each of said sections under a predetermined pressure, conduit means for supplying a cooling fluid under pressure to said pressure supply means, means responsive to the pressure of the fluid in said conduit means for causing operation of said fluid pressure supply means, and means responsive to the fluid pressure in each of said resistor sections for controlling said connecting means to disconnect said resistor from said motor when the fluid pressure in one of said sections reaches a predetermined maximum value.

JOHN F. TRITLE.
JACOB W. McNAIRY.
CHARLES A. PETERSEN.